United States Patent
York et al.

(10) Patent No.: US 11,703,372 B2
(45) Date of Patent: Jul. 18, 2023

(54) REMOTE MEASURING LIQUID LEVEL SENSOR FOR INTERMEDIATE BULK CONTAINER APPLICATIONS

(71) Applicant: Parker-Hannifin Corporation, Cleveland, OH (US)

(72) Inventors: Alexander York, Eden Prairie, MN (US); Nikolas D. Giese, Minneapolis, MN (US)

(73) Assignee: Parker-Hannifin Corporation, Cleveland, OH (US)

( * ) Notice: Subject to any disclaimer, the term of this patent is extended or adjusted under 35 U.S.C. 154(b) by 29 days.

(21) Appl. No.: 17/571,650

(22) Filed: Jan. 10, 2022

(65) Prior Publication Data

US 2022/0221321 A1 Jul. 14, 2022

Related U.S. Application Data

(60) Provisional application No. 63/136,837, filed on Jan. 13, 2021.

(51) Int. Cl.
*G01F 23/26* (2022.01)
*G01F 23/263* (2022.01)

(52) U.S. Cl.
CPC .......... *G01F 23/263* (2013.01); *G01F 23/268* (2013.01)

(58) Field of Classification Search
CPC ............................ G01F 23/263; G01F 23/268
See application file for complete search history.

(56) References Cited

U.S. PATENT DOCUMENTS 4,201,085 A * 5/1980 Larson .................. G01F 23/263
                                                                    73/304 C
5,465,619 A * 11/1995 Sotack ............... G03G 15/0856
                                                                    118/694

(Continued)

FOREIGN PATENT DOCUMENTS

CH           705731 B1     9/2016
CN    107525564 A * 12/2017   ......... G01F 23/263

(Continued)

OTHER PUBLICATIONS

Editorial Staff, Capacitance Level Sensor Principle, Limitations, Installation & Calibration, https://instrumentationtools.com/capacitance-level-sensor-principle/, Jan. 27, 2021.

*Primary Examiner* — Francis C Gray
(74) *Attorney, Agent, or Firm* — Renner, Otto, Boisselle & Sklar, LLP

(57) ABSTRACT

A sensor system is described that can be attached to the outside wall of a nonmetallic container located within an outer cage, and that measures with high resolution a level of liquid inside the container using capacitance changes at the sensor system. The sensor system includes a sensing element having a metal channel that houses a foam ribbon, and a conductive strip is applied to the foam ribbon oppositely from the metal channel to form a capacitor. Sensor electronics can determine capacitance changes from which the liquid level is determined, and can transmit sensor information wirelessly to an external electronic device. The sensor system further includes a compression assembly for fixing the sensing element to the cage while maintaining the sensing element applied against an outer surface of the container in a highly conformable manner. The compression (Continued)

assembly includes components for attachment to the cage bars, and one or more springs bias the sensing element against the container.

20 Claims, 11 Drawing Sheets

(56) References Cited

U.S. PATENT DOCUMENTS

| | | | | |
|---|---|---|---|---|
| 8,810,260 | B1* | 8/2014 | Zhou | G01F 23/265 |
| | | | | 73/304 C |
| 2008/0156801 | A1 | 7/2008 | Tung et al. | |
| 2013/0276533 | A1* | 10/2013 | Wilder | G01F 23/263 |
| | | | | 73/304 C |
| 2017/0105670 | A1* | 4/2017 | Holt | G01F 23/263 |
| 2019/0126631 | A1* | 5/2019 | Anderson | B41J 2/17546 |
| 2020/0209044 | A1* | 7/2020 | Holt | G01N 27/22 |

FOREIGN PATENT DOCUMENTS

| | | | | |
|---|---|---|---|---|
| CN | 111780832 A | * | 10/2020 | |
| JP | 2018052531 A | | 4/2018 | |
| WO | 2015102152 A1 | | 7/2015 | |
| WO | WO-2020112182 A1 | * | 6/2020 | G01F 23/261 |

* cited by examiner

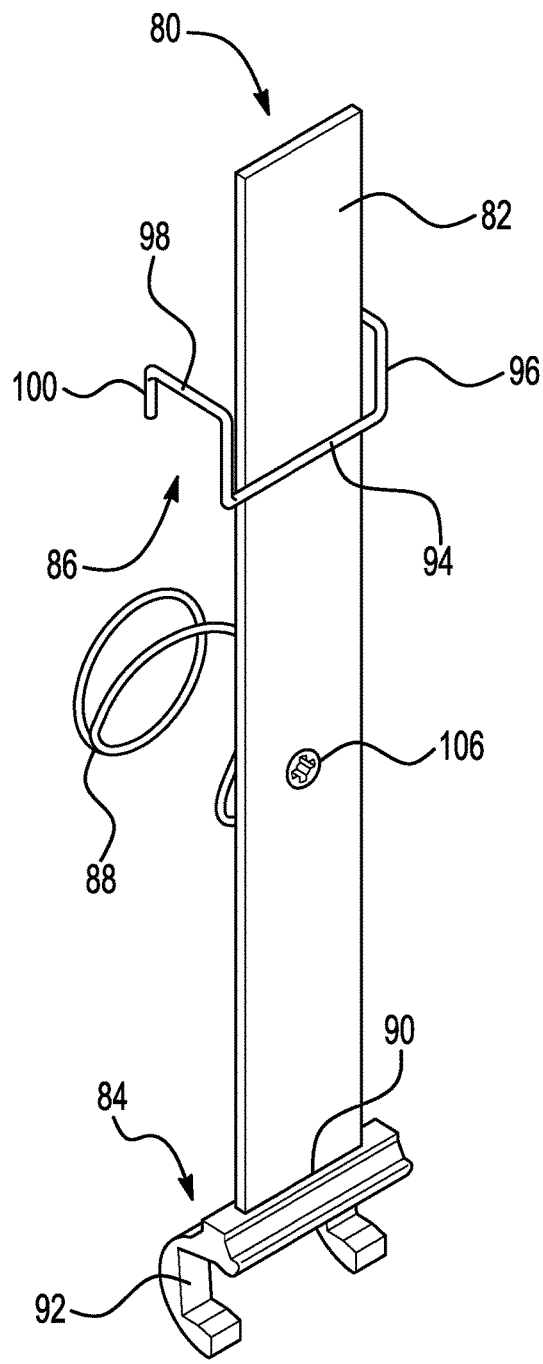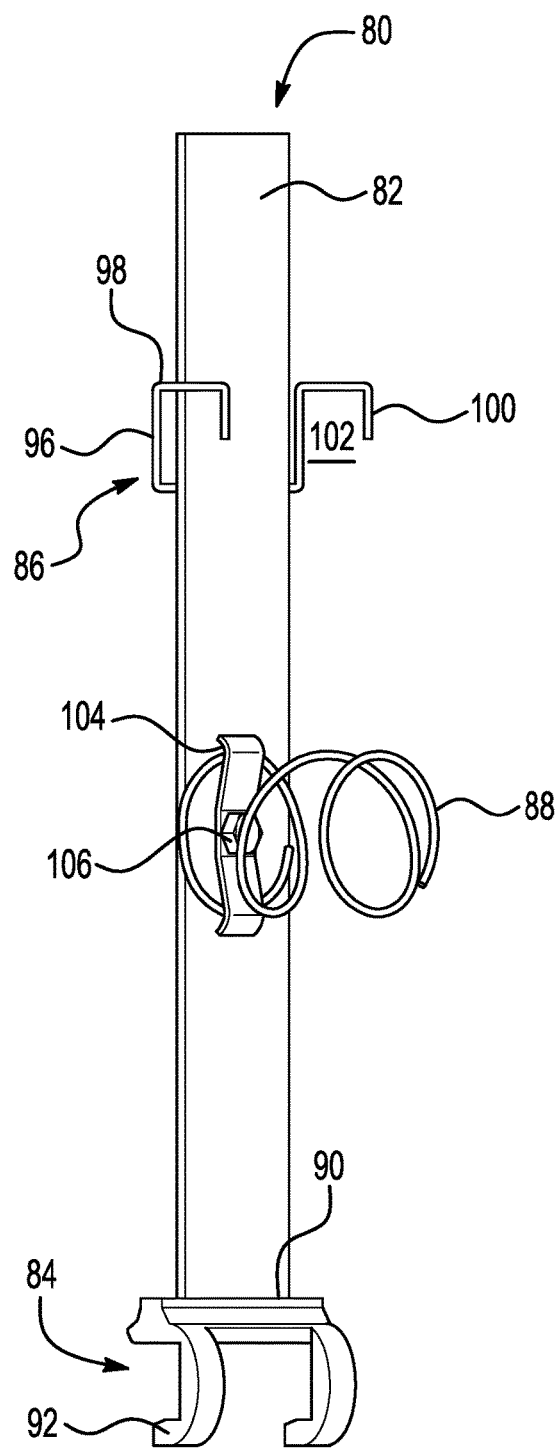
FIG. 15
FIG. 16

REMOTE MEASURING LIQUID LEVEL SENSOR FOR INTERMEDIATE BULK CONTAINER APPLICATIONS

This application claims priority of U.S. Application No. 63/136,837, filed Jan. 13, 2021, the entire disclosure of which is hereby incorporated by reference.

FIELD OF INVENTION

The present application relates to externally located liquid level sensors for remotely measuring liquid levels in nonmetallic bulk containers. Such a measuring system is particularly suitable for measuring liquid levels in containers used for storing hazardous or corrosive liquid materials, as well as liquids that cannot come into contact with the sensor itself, as may be used for example in diesel exhaust fluid applications and other intermediate bulk container applications.

BACKGROUND OF THE INVENTION

One example of a liquid level sensor is a capacitive liquid level sensor. One type of capacitive liquid level sensor operates by measuring a mutual capacitance between two conductors, such as between two metallic plates or electrodes. In the absence of liquid, the two conductors have an intrinsic capacitance, and the capacitance changes from the intrinsic capacitance in the presence of a liquid nearby. In particular, the presence of liquid near the two conductors causes the capacitance between the two conductors to vary, and thus the capacitive liquid level sensor operates by measuring a change in this capacitance and determining a liquid level based on such change in capacitance. Another type of capacitive liquid level sensor utilizes a single conductor that has an intrinsic capacitance with the surrounding environment. This capacitance, referred to as "self-capacitance", also will change based on the presence of a liquid nearby and thus likewise can be used to determine a liquid level. A capacitive liquid level sensor can detect a liquid through a non-conductive barrier, such as through a plastic container wall. Common capacitive sensors further may include a capability to electronically transmit, and preferably wirelessly transit, liquid level measurements to another electronic device for easy monitoring.

In many industrial applications, plastic containers are preferred for storing hazardous and corrosive liquid because the plastic containers do not degrade due to the corrosive properties of the liquid. In addition, to prevent exposure to the hazardous liquid, it is desirable to minimize the need for opening the container, such as to check the liquid level. For such applications, a capacitive level sensor is particularly suitable because the liquid level can be detected from outside the plastic container through the container wall. In conventional configurations, a capacitive sensing strip may be taped or otherwise adhered to an outer surface of the container. In some applications, however, for additional safety the plastic container further is contained within an outer cage, which is configured essentially as a frame that renders direct contact with the container more difficult. For example, diesel exhaust fluid (DEF) often is stored in plastic containers further isolated using an outer cage. In DEF and similar applications, therefore, the installation of a capacitive sensor to an outer surface of the plastic container is rendered difficult by presence of the cage, and therefore enhanced capacitive sensor configurations are needed.

SUMMARY OF THE INVENTION

Embodiments of the present application include a liquid level sensor system that can be attached to the outside wall of a nonmetallic bulk container, and that measures with high resolution a level of liquid inside the container using capacitance changes at the sensor system. The sensor system transmits capacitance measurements and/or the determined liquid level wirelessly to an external electronic device, either through a direct wireless communication or indirectly via the Internet, for easy monitoring of the liquid level over said Internet connection or using an application on a mobile communication device. The sensor system has a capacitive sensing element that is configured as a continuous capacitive sensing element that is highly conformable to the outside surface of the container. The sensing element is shielded so that the sensing element only reacts to liquid inside the container, and thus will not react to external influences like rain, humidity, moisture, and like environmental conditions. The sensing element also has a hard outer component for durability. The sensing element can fit within the cage of an intermediate bulk container (IBC), and therefore the sensing element is particularly suitable for liquid level sensing of diesel exhaust fluid (DEF) containers and for comparable applications in which liquid containers contain hazardous liquid and are located in harsh environments.

In exemplary embodiments, the sensor system includes a capacitive sensing element that includes a conductive strip that is highly conformable to the outer surface of the container, and a capacitance associated with the conductive strip changes at the same rate as the liquid level, such as DEF, inside a nonmetallic IBC. The sensing element is placed between a cage and the container, with the sensing element being held against the outer surface of the container with a compression assembly having components that attach to the cage.

In exemplary embodiments, the sensing element includes a metal channel, such as a U-shaped aluminum channel, that houses a ribbon of foam material. At least one conductive strip is applied to the foam ribbon oppositely from the metal channel, and thus the metal channel and conductive strip with the foam ribbon material therebetween form a capacitor. The sensor system further includes sensor electronics, and an electrical connection is applied from the sensor electronics to the conductive strip. The sensor electronics further includes a wireless transmitter for wirelessly transmitting sensor information from the sensor electronics to an external electronic device for monitoring the liquid level. The sensor system further includes an electronic controller for receiving a capacitance measurement and determining a liquid level based on the capacitance measurement. The at least one conductive strip may include a plurality of conductive strips of different lengths to permit sensing the liquid level through different zones of the container.

In exemplary embodiments, the sensing system further includes a compression assembly for fixing the sensing element to an outer cage while maintaining the sensing element applied against an outer surface of a container located within the cage. The compression assembly may include a channel frame having a base and opposing sides perpendicular to the base to form a channel that fits over a cage bar and receives the sensing element. The channel frame sides have a plurality of cutouts that are positioned in use to extend around cross bars of the cage, and the compression assembly further includes a plurality of clamps that secure the channel frame to the cage bars at the cutouts. The compression assembly further includes a plurality of springs located within the channel that extend from the base of the channel frame to provide an outward bias from the base. In use, the sensing element is placed within the channel over the springs such that the springs are compressed, and the outward bias of the springs presses the sensing element against the outer surface of the container. Because of the nature of the conductive strip and foam ribbon, the sensing element is highly conformable to the outer surface of the container when pressed by the springs.

In exemplary embodiments, the compression assembly includes a compression plate, and a bar retainer that is attached to a first end of the compression plate and includes a recessed retainer that is configured to receive a first cross bar of the cage. A wire clip includes a plurality of clip segments that form a bar channel that is configured to receive a second cross bar of the cage different from the first cross bar received by the bar retainer, wherein the wire clip is configured to clip the compression plate to the second cross bar. The compression assembly further includes a spring that is positioned on the compression plate, wherein the spring when compressed asserts an outward bias from the compression plate to press the sensing element against the outer surface of the container. Because of the nature of the conductive strip and foam ribbon, the sensing element is highly conformable to the outer surface of the container when pressed by the spring.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto. Features that are described and/or illustrated with respect to one embodiment may be used in the same way or in a similar way in one or more other embodiments and/or in combination with or instead of the features of the other embodiments.

BRIEF DESCRIPTION OF THE DRAWINGS

FIG. 15 is a drawing depicting a first view of another configuration of an exemplary compression assembly for use in the sensor system in accordance with embodiments of the present application.

FIG. 16 is a drawing depicting a second view of the compression assembly of FIG. 15 from an opposing viewpoint relative to FIG. 15.

DETAILED DESCRIPTION

Figure 1:
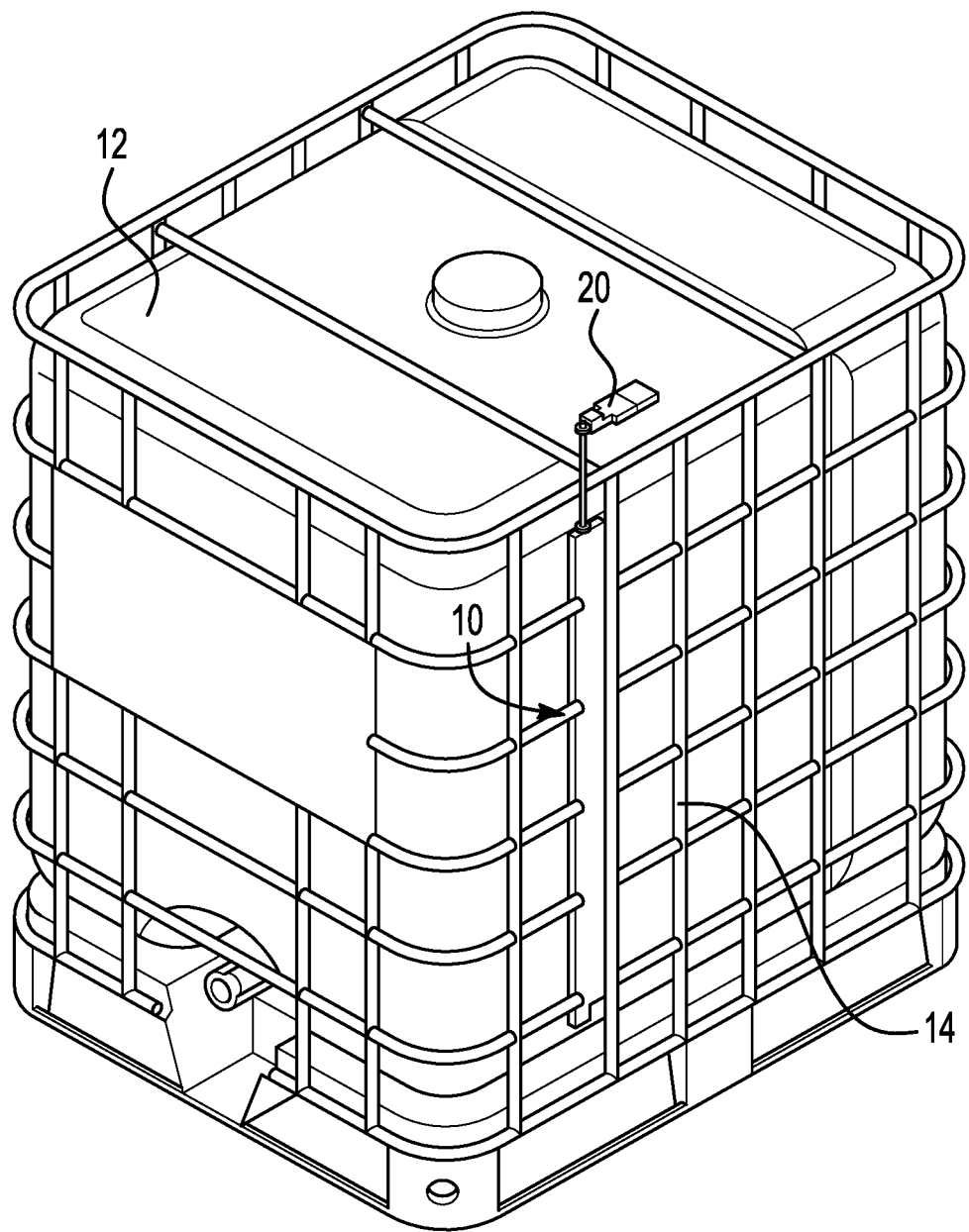
FIG. 1 is a drawing depicting an exemplary sensor system positioned on a container and cage in accordance with embodiments of the present application.

Embodiments of the present application will now be described with reference to the drawings, wherein like reference numerals are used to refer to like elements throughout. It will be understood that the figures are not necessarily to scale.

Embodiments of the present application include a liquid level sensor system that can be applied to an outer surface of a nonmetallic bulk container, and that measures with high resolution a level of liquid inside the container using capacitance changes at the sensor system. The sensor system transmits capacitance measurements and/or the determined liquid level wirelessly to an external electronic device, either through a direct wireless communication or indirectly via the Internet, for easy monitoring of the liquid level over said Internet connection or using an application on a mobile communication device. The sensor system has a capacitive sensing element that is configured as a continuous capacitive sensing element that is highly conformable to the outside surface of the container. The sensing element is shielded so that the sensing element only reacts to liquid inside the container, and thus will not react to external influences like rain, humidity, moisture, and like environmental conditions. The sensing element also has a hard outer component for durability. The sensing element can fit within the cage of an intermediate bulk container (IBC), and therefore the sensing element is particularly suitable for liquid level sensing of diesel exhaust fluid (DEF) containers and for comparable applications in which liquid containers contain hazardous liquid and are located in harsh environments.

Figure 2:
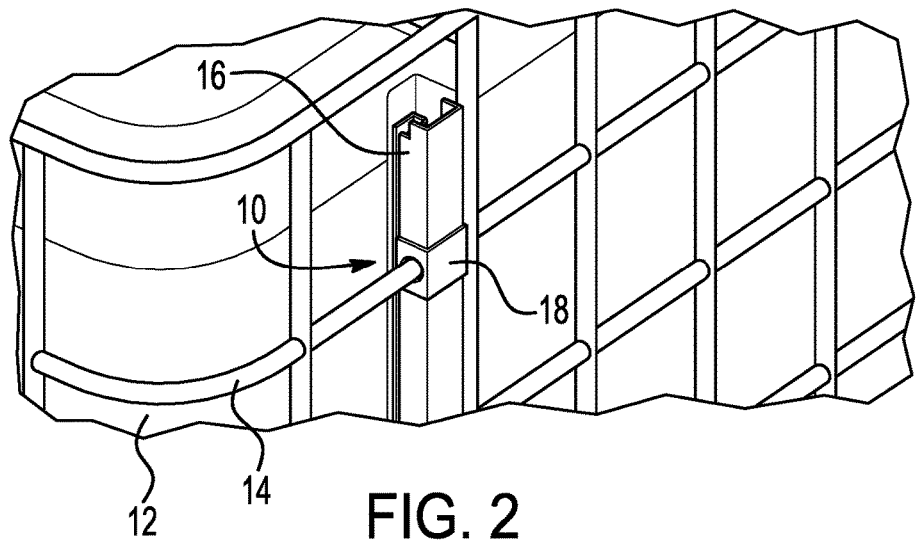
FIG. 2 is a close-up view of a portion of FIG. 1.

FIG. 1 is a drawing depicting an exemplary sensor system 10 positioned on a container and cage in accordance with embodiments of the present application, and FIG. 2 is a close-up view of a portion of FIG. 1. The sensor system 10 is employed to measure a liquid level of a liquid contained in a nonmetallic container 12 that is housed within an outer cage 14. In general, the sensor system 10 includes a capacitive sensing element 16 and a compression assembly 18, whereby the compression assembly 18 provides attachment of the sensing element 16 to the cage 14 while applying the sensing element 16 to an outer surface of the container 12. The sensor system 10 further includes sensor electronics 20 (see FIG. 1), which as further detailed below includes a wireless transmitter for wirelessly transmitting sensor information from the sensor electronics to an external electronic device by any suitable wireless interface technology for efficient liquid level monitoring.

Figure 3:
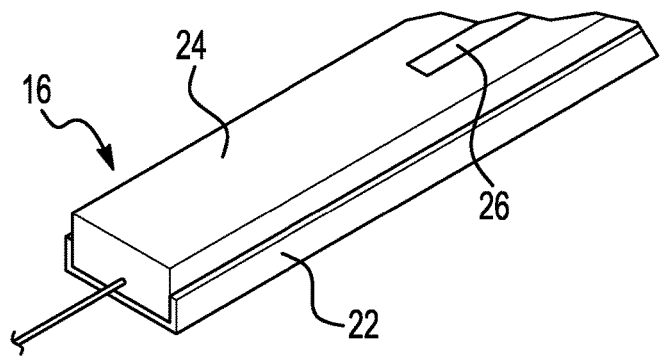
FIG. 3 is drawing depicting an exemplary embodiment of a capacitive sensing element in accordance with embodiments of the present application.
Figure 4:
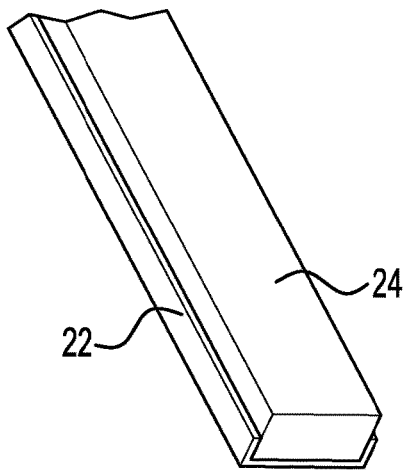
FIG. 4 is a drawing depicting a first stage of assembling the sensing element of FIG. 3.
Figure 5:
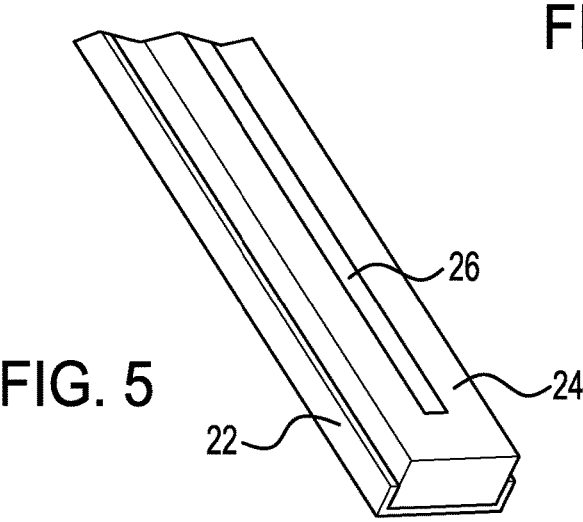
FIG. 5 is a drawing depicting a second stage of assembling the sensing element of FIG. 3.
Figure 6:
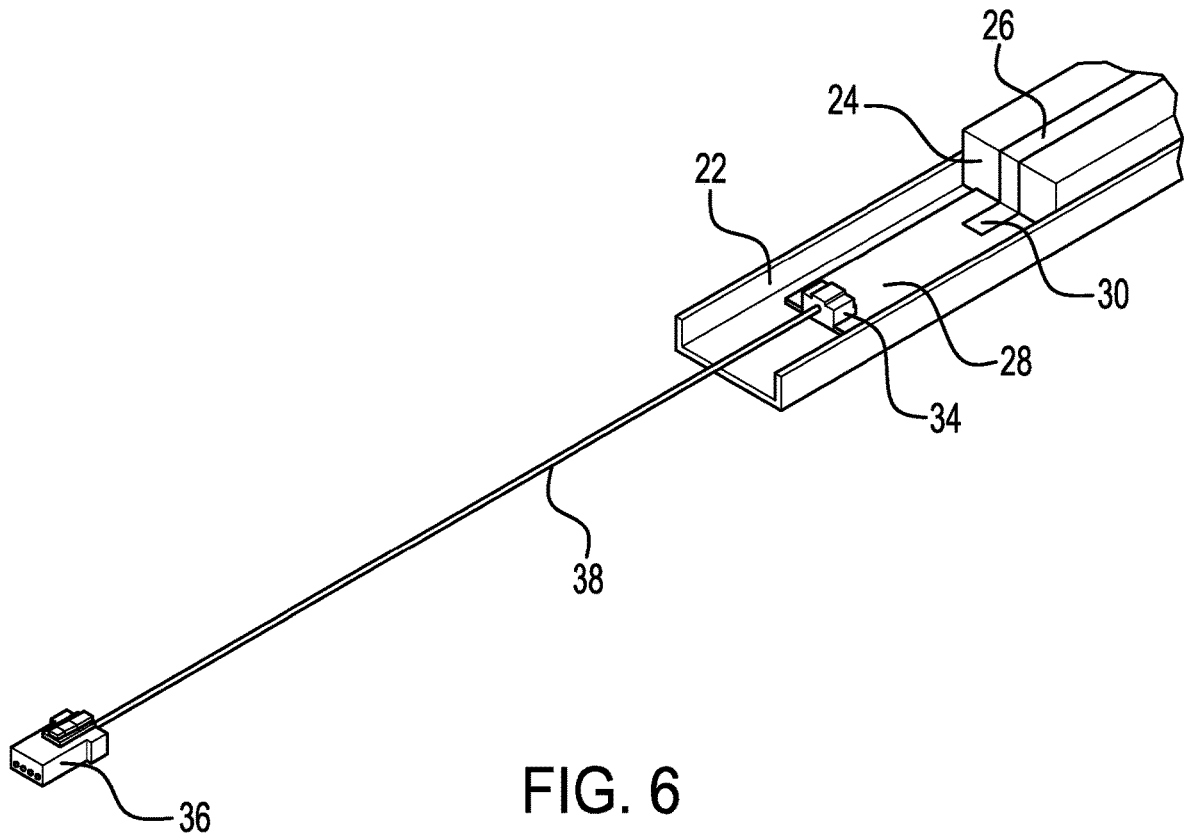
FIG. 6 is a drawing depicting a third stage of assembling the sensing element of FIG. 3.
Figure 7:
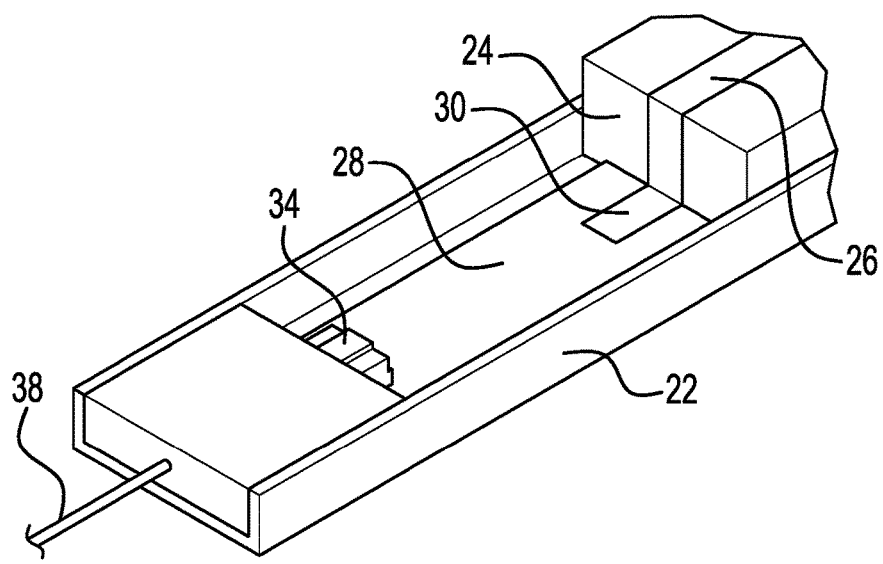
FIG. 7 is a drawing depicting a fourth stage of assembling the sensing element of FIG. 3.

FIG. 3 is drawing depicting an exemplary embodiment of the capacitive sensing element 16 in isolation, and FIGS. 4-7 depict exemplary stages of assembling the sensing element 16. In exemplary embodiments, the capacitive sensing element 16 includes at least one conductive strip, and a capacitance associated with the at least one conductive strip changes at the same rate as the liquid level, such as DEF, inside a nonmetallic IBC. The sensing element is placed between a cage and the container, with the sensing element being held against the container with a compression assembly having components that attach to the cage, as further detailed below.

Referring to FIGS. 3-7, the sensing element 16 includes a metal channel 22, such as a U-shaped aluminum channel, that houses a ribbon of foam material 24. At least one conductive strip 26 is applied to the foam ribbon 24 oppositely from the metal channel 22, and thus the metal channel 22 and conductive strip 26 with the foam ribbon 24 therebetween form a capacitor. The conductive strip 26 is made of a material suitable for conforming to the outer surface of the container to which the sensing element is to be applied. Accordingly, the strip configuration combined with a suitable conductive material composition renders the conductive strip 26 both flexible and stretchable for precisely conforming to the outer surface of the container. Suitable materials for the conductive strip 26 include, for example, a conductive fabric such as a nickel fabric tape, or a conductive paint material such as carbon black or silver painted onto a silicone rubber base. The foam material 24 may be any suitable rubber material that is compressible and flexible to aid conformance of the conductive strip 26 with the outer surface of the container. For outdoor applications in particular, a compressible hydrophobic material is preferred to avoid absorption of moisture. Ethylene vinyl acetate (EVA) foam is a suitable foam material that meets such properties. The metal channel 22 is a rigid and hard component that provides both physical durability and shielding of the sensing element 16 from harsh environmental conditions.

For assembly, the U-shaped metal channel 22 is cut to a desired size, and the foam ribbon 24 is inserted into the channel 22 and fixed flush within the channel using any suitable means, such as using an adhesive. The conductive strip 26 is then applied centrally to a face of the foam ribbon 24 opposite from a face of the foam ribbon 24 that is fixed against the metal channel 22. As referenced above, the conductive strip may be applied to the foam ribbon by any suitable means, such as by using an adhesive or painting a conductive strip onto the foam ribbon. Initially during assembly, as illustrated particularly in FIG. 6, a portion of the metal channel 22 remains exposed, and a printed circuit board (PCB) 28 is fixed to the metal channel 22, for example using a double-sided tape. An end 30 of the conductive strip 26 extends from the foam ribbon 24 and connects to the PCB 28 to provide electrical connection to the conductive strip 26. The PCB 28 includes suitable circuitry to measure a capacitance of the sensing element 16. A first electrical connector 34 on the PCB 28 and a second electrical connector 36 are connected to each other via wiring 38, and the second electrical connector 36 plugs into the sensor electronics 20 to provide the electrical connection between the sensor electronics 20 and the sensing element 16. Additional segments of the foam ribbon material 24 are then applied to cover the initially exposed portion of the metal channel 22 including the PCB 28, resulting in the assembled configuration depicted in FIG. 3.

The sensor electronics 20 includes embedded electronics for electrical communication with the sensing element 16. For example, the sensor electronics 20 includes a battery to power the sensing element. A substantially low power level is suitable, and thus long battery life is achieved. The PCB 28 includes capacitance reading circuitry that can electronically communicate capacitance measurement values to the sensor electronics 20. The sensor electronics 20 further includes a wireless transmitter for wirelessly transmitting sensor information from the sensor electronics to an external electronic device, which can include transmitting capacitance measurements and/or associated liquid level values as read by the PCB capacitance reading circuitry. For example, a capacitance measurement may be rendered by the PCB and communicated to the sensor electronics, which is then wirelessly transmitted to an external electronic device that can determine a liquid level based on the capacitance measurement. Any suitable wireless communication technology may be employed. For example, sensor information may be transmitted from the sensor electronics directly to the external electronic device, such as by Bluetooth or other short-range direct wireless communication. Additionally or alternatively, sensor information may be transmitted from the sensor electronics indirectly to the external electronic device over the Internet or other wireless network, such as by WiFi, a cellular network, or other comparable networked wireless communication. The sensor electronics further may include GPS tracking capabilities for tracking container locations as may be desirable in inventory tracking systems.

Figure 8:
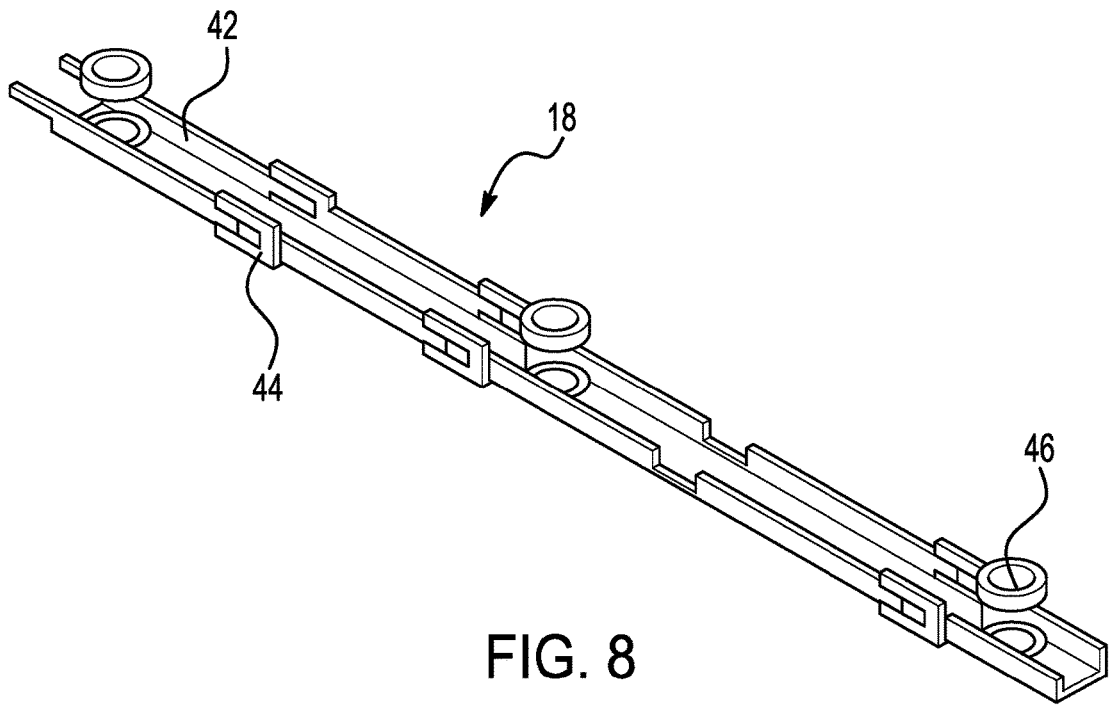
FIG. 8 is a drawing depicting an exemplary compression assembly in accordance with embodiments of the present application.

As referenced above, the sensor system 10 further includes the compression assembly 18 that provides attachment of sensing element 16 to the outer cage while applying the sensing element 16 against an outer surface of the container. FIG. 8 is a drawing depicting an exemplary compression assembly 18 in accordance with embodiments of the present application, with FIGS. 9 and 10 respectively depicting front and side views of the compression assembly 18 of FIG. 8. In general, the compression assembly 18 includes a channel frame 42, a plurality of clamps 44, and a plurality of compression springs 46. The channel frame 42, one of the clamps 44, and one of the compressions springs 46 are depicted respectively in isolation in FIGS. 11-13. The components of the compression assembly may be made of any suitable rigid material, such as various metal and plastic materials, as are commonly used for clamping type attachments.

Figure 11A:
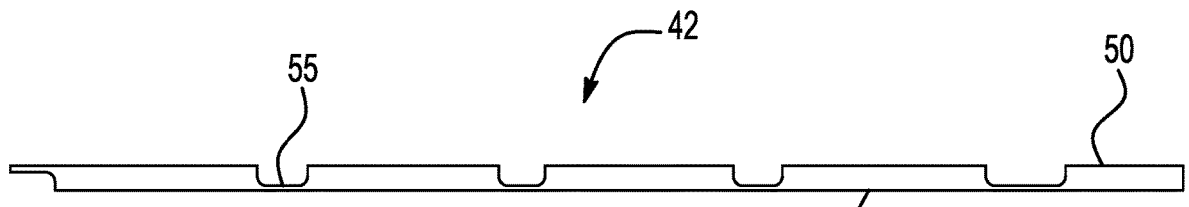
FIG. 11A is a drawing depicting a side view of a channel frame component of the compression assembly in isolation.
Figure 11B:
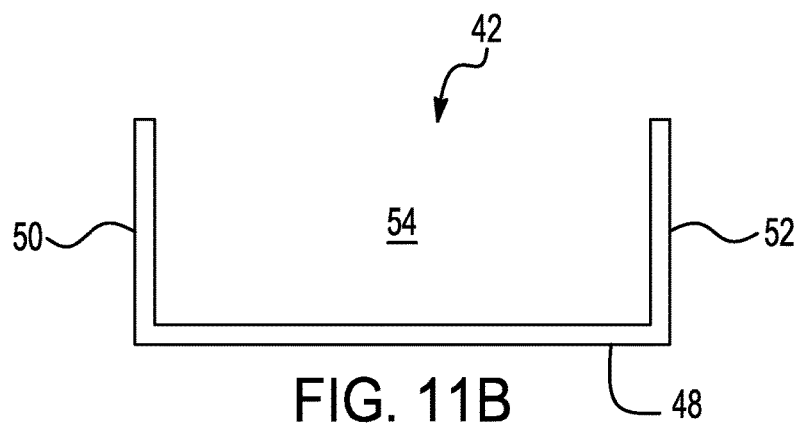
FIG. 11B is a drawing depicting an edge view of the channel frame of FIG. 11A.

FIG. 11A illustrates a side view of the channel frame 42 in isolation, and FIG. 11B illustrates an edge view of the channel frame 42 of FIG. 11A. In exemplary embodiments, the channel frame 42 includes a base 48 and opposing sides 50 and 52 that extend perpendicularly from the base 48 to form a bar channel 54 that receives one of the longitudinal cage bars and the sensing element 16, as further detailed below. The channel frame sides 50 and 52 have a plurality of cutouts 55 that are positioned in use to extend around cross bars of the cage, as also further detailed below.

Figure 12A:
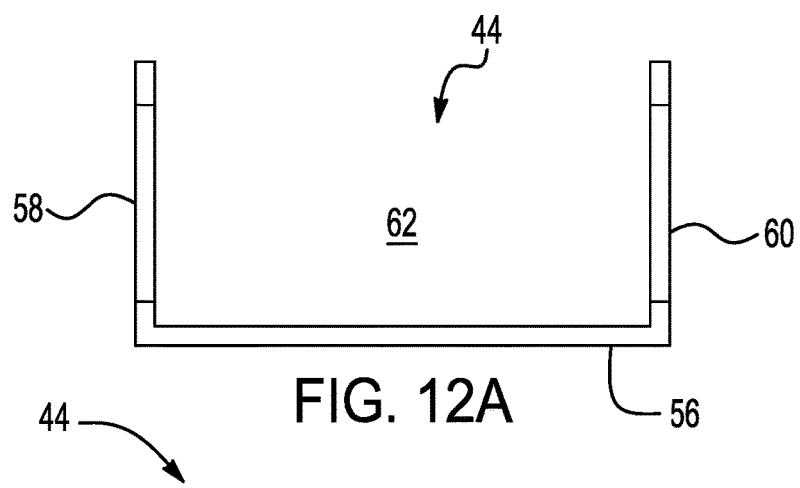
FIG. 12A is a drawing depicting a first side view of one of the clamps of the compression assembly in isolation.
Figure 12B:
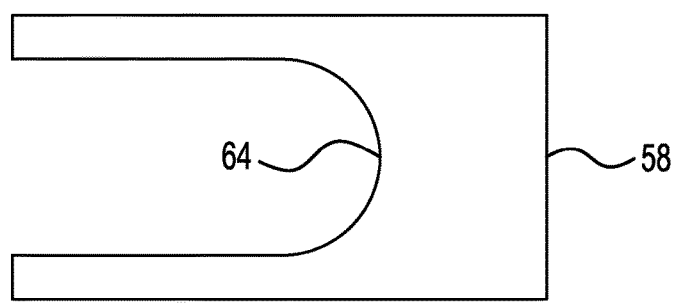
FIG. 12B is a drawing depicting a second side view of the clamp from a perpendicular viewpoint relative to FIG. 12A.

FIG. 12A illustrates a first side view of one of the clamps 44 in isolation, and FIG. 12B illustrates a second side view of the clamp 44 from a perpendicular viewpoint relative to FIG. 12A. In general, the plurality of clamps 44 secure the channel frame 42 to the cage bars. As illustrated first in FIG. 12A, each of the plurality of clamps 44 may be configured as a U-shaped clamp having a clamp base 56 and opposing arms 58 and 60 that define a frame receiving space 62 therebetween. In addition as illustrated in FIG. 12B, each of the arms 58 and 60 (only one arm is shown from the side viewpoint of FIG. 12B) has a bar-receiving cutout 64. The bar-receiving cutout may be rounded or otherwise shaped commensurately with a cage bar cross-sectional shape. As further detailed below, the combination in the configuration of the clamp 44 of the frame receiving space 62 and bar receiving cutout 64 permits the clamp 44 to interact with and secure against both the channel frame 42 and the cage bars.

Figure 9:
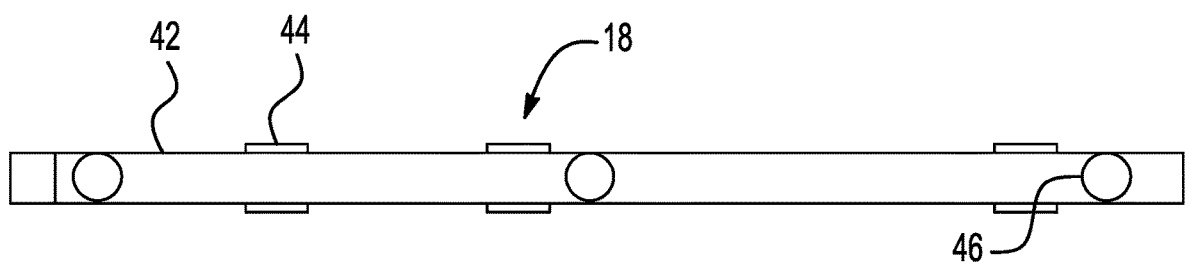
FIG. 9 is a drawing depicting a front view of the compression assembly of FIG. 8.
Figure 10:
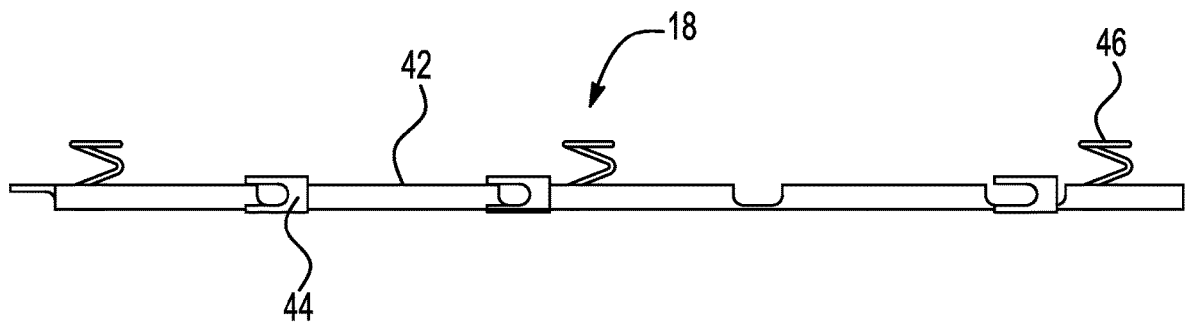
FIG. 10 is a drawing depicting a side view of the compression assembly of FIG. 8.
Figure 13:
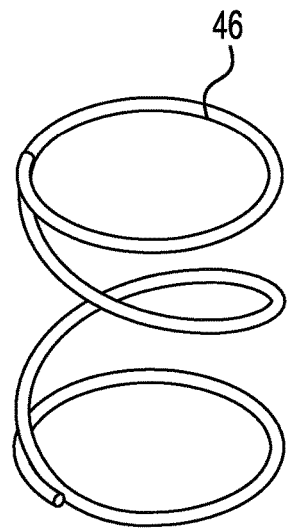
FIG. 13 is a drawing depicting one of the compression springs of the compression assembly in isolation.

FIG. 13 illustrates one of the compression springs 46 in isolation. Referring to FIG. 13 is combination with FIGS. 8-10 illustrating the overall compression assembly 18, the plurality of compression springs 46 are located within the frame channel 54 of the channel frame 42, whereby the compression springs 46 extend from the base 48 of the channel frame 42 to provide an outward bias from the base. As further detailed below, when in use the sensing element 16 is placed over the bar channel 54 and thus over the springs 46 such that the springs are compressed, and the outward bias of the springs 46 presses the sensing element 16 against the outer surface of the container. Although in exemplary embodiments the compression springs 46 are illustrated as coil springs, other suitable spring configurations such as leaf springs or comparable may be employed.

Figure 14:
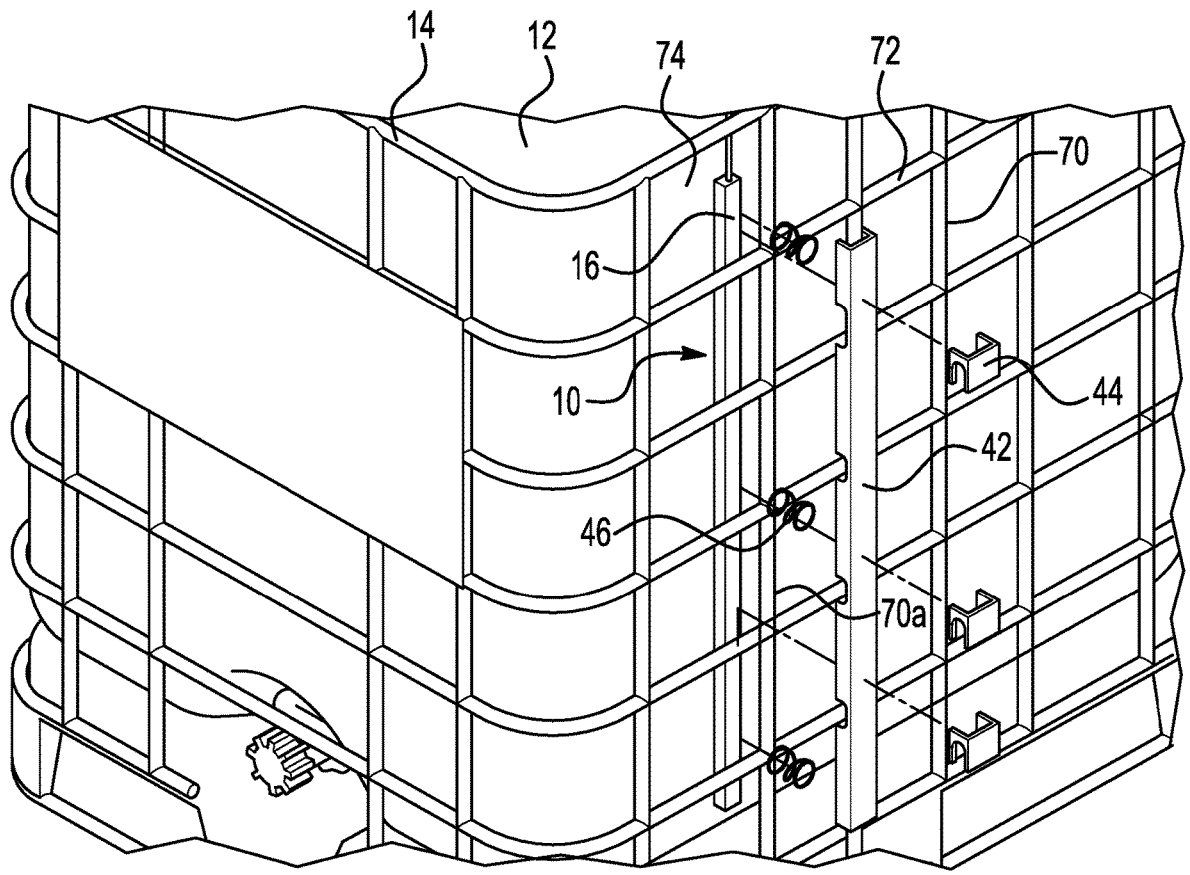
FIG. 14 is a drawing depicting an exploded view of the exemplary sensor system relative to a container and cage, which illustrates the manner by which the sensor system is applied.

FIG. 14 is a drawing depicting an exploded view of the sensor system 10 relative to a container 12 and cage 14, which illustrates the manner by which the sensor system 10 is applied. A typical cage 14 includes longitudinal bars 70 and transverse cross bars 72. The sensing element 16 is positioned against an outer surface 74 of the container 12, with the conductive strip 26 positioned against the outer container surface 74. As referenced above, with such positioning the metal channel 22 faces outward relative to the outer container surface and thus provides both physical durability and shielding to the sensing element 16 from harsh environmental conditions. The sensing element extends longitudinally along the outer container surface 74, i.e., from a location near the bottom of the container towards the top of the container. As also referenced above, the sensing element 16 is thereby configured as a continuous capacitive sensing element that is highly conformable to the outer surface of the container, and the liquid level is determined based on capacitance changes that are measured along the sensing element.

For securing the sensing element 16, the sensing element 16 is aligned with one of the longitudinal cage bars 70a. Referring to the components of the compression assembly 18 (see FIGS. 8-12 also), the channel frame 42 is positioned such that the longitudinal cage bar 70a, i.e., the cage bar with which the sensing element 16 is aligned, is received within the bar channel 54. In addition, the channel frame 42 is positioned such that the cage cross bars 72 extend through the cutouts 55 of the channel frame 42. The compression springs 46 further are located to extend outward from the bar channel 54 at positions between the cutouts 55, i.e. between the cage cross bars 72. The clamps 44 also are fixed to the channel frame 42. In particular, initially the clamps are clamped to the base 48 of the channel frame 42 outward relative to the bar channel 54, and thus the base 48 of the channel frame 42 is received within the frame receiving spaces 62 of the clamps 44. Once the clamps 44 are clamped onto the channel frame 42, the clamps may be slid downwardly along the channel frame 42 until the cage cross bars 72 respectively are received within the bar receiving cutouts 64. In this manner, the compression assembly is clamped to the cage in a secured fashion. In addition, once the clamps 44 are applied, the compression springs 46 are compressed, and the outward bias of the compression springs 46 presses the sensing element 16 against the outer surface of the container 12 to hold the sensing element against the outer surface of the container 12, and more specifically with the at least one conductive strip pressed against the outer surface of the outer in a highly conformable manner.

The resultant assembled configuration is illustrated in FIGS. 1 and 2 referenced above. The sensor electronics 20 of the sensor system 10 may be fixed to the container 12 at any suitable location, with the top of the container being a suitable location as illustrated in FIG. 1. In addition, any suitable mechanism, such as for example adhesives or mechanical fastening elements, may be used to fix the sensor electronics to the container. Variations of the sensor system 10 may be employed to accommodate different container and cage configurations for different applications and circumstances. The sensing element and channel frame of the compression assembly may be sized and shaped for any size container and cage. Relatedly, the channels and cutout spaces defined by the components of the compression assembly that receive the various cage bars also may be sized, shaped, and spaced apart as warranted to accommodate any cage configuration.

A potential drawback of the compression assembly 18 is that the positioning of the cutouts 55 in the channel frame 42, which are formed at the time of initial manufacturing, is fixed. As a result, a given compression assembly 18 would be configured at the time of manufacture to accommodate a given spacing specifically of the transverse cage cross bars 72. Although cages tend to come in given configurations, there can be some differences in the cage bar spacing among cages for different sized containers and/or different applications. As referenced above, the cutout spaces may be spaced apart as warranted to accommodate any cage configuration, but this occurs at the time of manufacture and thus a given compression assembly 18 is suitable only for a particular cage bar spacing. Subsequent embodiments provide alternative configurations of the compression assembly to be more versatile in accommodating essentially any cage bar spacing.

Subsequent figures depict alternative configurations of a compression assembly that provides attachment of the sensing element 16 to the outer cage while applying the sensing element 16 against an outer surface of the container. In particular, FIG. 15 is a drawing depicting a first view of an exemplary compression assembly 80 in accordance with embodiments of the present application, with FIG. 16 depicting a second view of the compression assembly 80 from an opposing viewpoint relative to FIG. 15. In general, the compression assembly 80 includes a compression plate 82, a bar retainer 84, a wire clip 86, and a compression spring 88. Similar to the previous embodiment, the components of the compression assembly 80 may be made of any suitable rigid material, such as various metal and plastic materials, as are commonly used for clamping type attachments. FIGS. 15 and 16 depict one compression assembly 80, and multiple iterations of the compression assembly 80 may be provided along the length of the container to apply the entire sensing element 16 securely to the outer surface of the container.

As seen in FIGS. 15 and 16, the compression plate 82 may be configured as a thin rectangular or other suitably shaped plate that provides a support structure for the other components of the compression assembly 80. The bar retainer 84 is attached to a first end of the compression plate 82, and a second end of the compression plate 82 opposite from the first end may be a free end. In the example of FIGS. 15 and 16, the bar retainer 84 is a separate component that defines a slot 90 that receives the first end of the compression plate 82. The bar retainer 84 may be made of metal or plastic. Alternatively, the compression plate 82 and the bar retainer 84 alternatively may be configured as a single integral component. The bar retainer 84 includes a recessed retainer 92 that is configured to receive a first one of the cross bars of the cage, as further detailed below. In this example, the recessed retainer is formed as two prongs effectively configured as a claw that receives and grips one of the cage cross bars. The recessed retainer 92 may be shaped as is suitable for any particular cage design to be commensurate with the associated cage bar cross-sectional shape, such as for example round cross-sectional cage bars versus square or rectangular cross-sectional cage bars.

The wire clip 86 includes a plurality of clip segments that are configured to secure the compression plate 82 to the cage toward the second end of the compression plate 82 opposite from the bar retainer 84. The wire clip 86 forms a bar channel that is shaped to receive a second one of the cage cross bars different or opposite from the first cross bar received by the bar retainer. In a particular example in which the cage bars have a rectangular cross section, the wire clip 86 includes a cross segment 94 (see particularly FIG. 15), which in use lays across the width of the compression plate 82. Opposing longitudinal segments 96 extend perpendicularly from the cross segment 94, such that in use the opposing longitudinal segments 96 extend essentially parallel to or in the direction of the longitudinal sides of the compression plate 82. Opposing transverse segments 98 extend perpendicularly from the longitudinal segments 96, and opposing retention segments 100 extend perpendicularly from the opposing transverse segments 98 so as to be parallel to and spaced apart from opposing longitudinal segments 96. In this manner, the opposing longitudinal segments 96, the opposing transverse segments 98, and the opposing retention segments 100 form a bar channel 102 that receives one of the cross bars of the cage, as further detailed below. The example of the wire clip 86 of FIGS. 15 and 16 is therefore particularly suitable for rectangular cross-sectional cage bars as the segments of the wire clip 86 form a rectangular bar channel 102. It will be appreciated that the segments of the wire clip 86 may be arranged to define or form a bar channel to accommodate any corresponding cage bar cross-sectional shape, such as for example rounded or other bar cross-sectional shapes.

The compression spring 88 may be configured comparably as the compression springs 46 of the previous embodiment. The compression spring 88 may be secured to the compression plate 82 approximately midway between the first and second ends of the compression plate 82 using any suitable fastener mechanism, such as for example a bolt or screw fastener. In the depicted example, the compression spring 88 may be positioned against the compression plate 82 with a spring retainer 104 (see particularly FIG. 16) and fixed with a bolt 106, although again any suitable fastener mechanism may be employed. The compression spring 88 is located and fixed to the compression plate 82, whereby the compression spring 88 extends from the compression plate 82 to provide an outward bias from the compression plate when the spring is compressed. As further detailed below, when in use the sensing element 16 is placed parallel to the compression plate 82 and thus over the compression spring 88 such that the spring is compressed, and the outward bias of the spring 88 relative to the compression plate 82 presses the sensing element 16 against the outer surface of the container. As referenced above in connection with the previous embodiment, although in exemplary embodiments the compression spring 88 is illustrated as a coil spring, other suitable spring configurations such as leaf springs or comparable may be employed.

Figure 17:
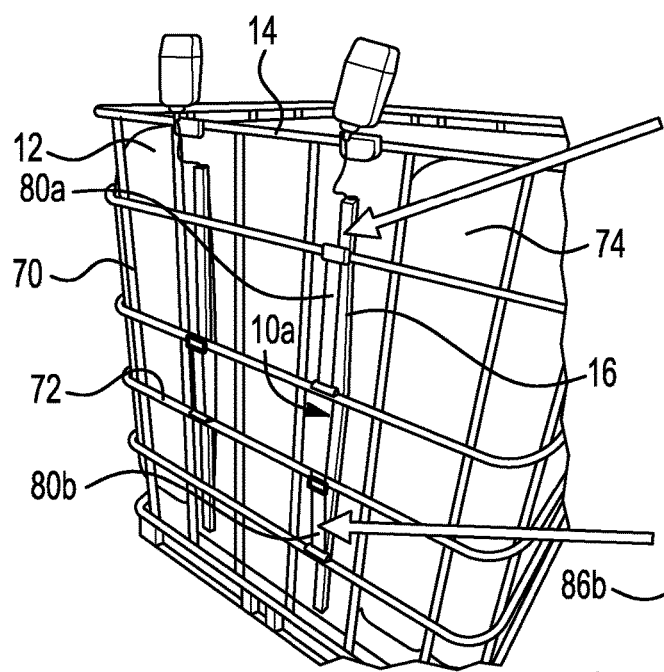
FIG. 17 is a drawing depicting another configuration of an exemplary sensor system which includes a sensing element and a plurality of compression assemblies of FIGS. 15 and 16.
Figure 18:
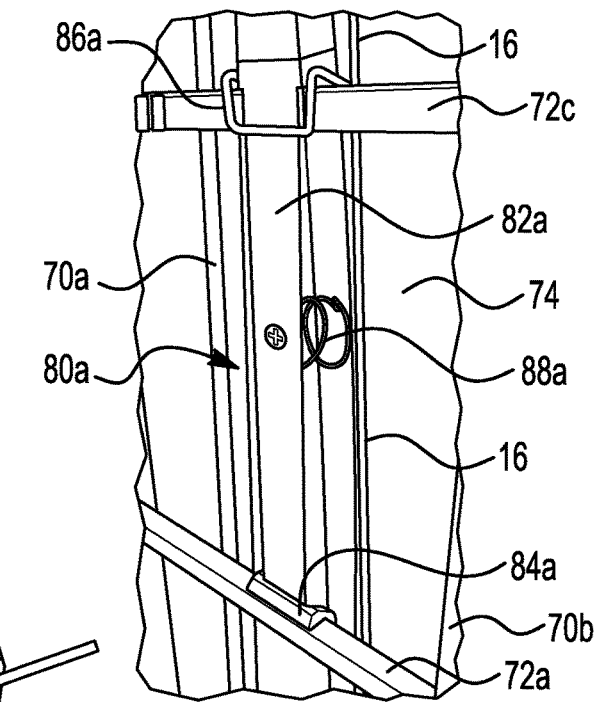
FIG. 18 is a drawing depicting a close-up view of a portion of FIG. 17 illustrating a portion of the sensor system in the region of a first compression assembly.
Figure 19:
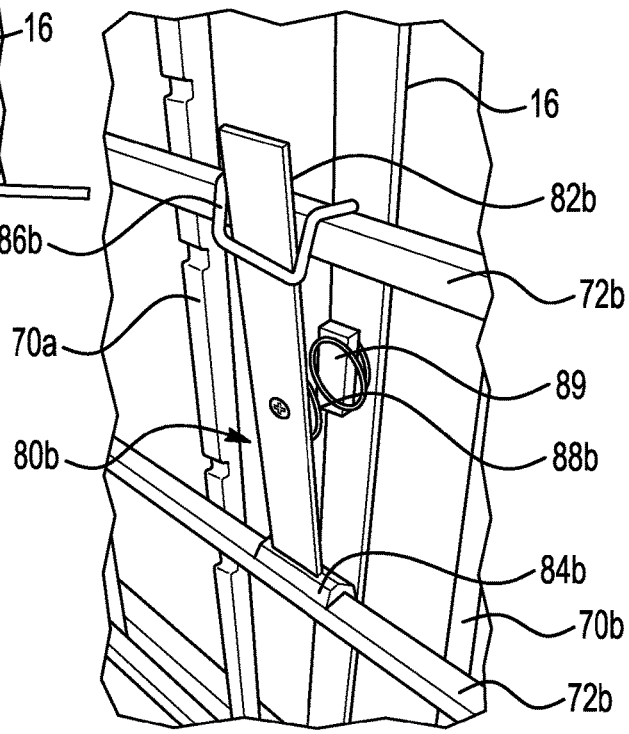
FIG. 19 is a drawing depicting a close-up view of a portion of FIG. 17 illustrating a portion of the sensor system in the region of a second compression assembly.

FIG. 17 is a drawing depicting a sensor system 10a which includes the sensing element 16 and a plurality of compression assemblies 80 of FIGS. 15 and 16. FIG. 17 illustrates the sensor system 10a as positioned relative to a container 12 and cage 14, which illustrates the manner by which the sensor system 10a is applied to the container and cage. FIG. 18 depicts a close-up view of a portion of FIG. 17 illustrating a portion of the sensor system 10a in the region of a first compression assembly 80a, and FIG. 19 depicts a close-up view of a portion of FIG. 17 illustrating a portion of the sensor system 10a in the region of a second compression assembly 80b. As referenced above in connection with the previous embodiment, a typical cage 14 includes longitudinal bars 70 and transverse cross bars 72. The sensing element 16 is positioned against an outer surface 74 of the container 12, with the at least one conductive strip 26 positioned against the outer container surface 74. The sensing element extends longitudinally along the outer container surface 74, i.e., from a location near the bottom of the container towards the top of the container. As also referenced above, the sensing element 16 is thereby configured as a continuous capacitive sensing element that is highly conformable to the outer surface of the container, and the liquid level is determined based on capacitance changes that are measured along the sensing element.

For securing the sensing element 16 in the embodiment of sensor system 10a including the compression assembly 80, the sensing element 16 positioned to run along the container 12 essentially parallel to and between two adjacent longitudinal cage bars 70a and 70b. Referring to the components of the compression assemblies 80a and 80b (see also FIGS. 15 and 16), as to each compression assembly the bar retainer 84a/84b is connected to a respective transverse cross bar 72.

The claw configuration of the prongs of the bar retainer holds the compression plate to the cross bar. In this example in particular, the bar retainer 84a of the first compression assembly 80a is secured to a first cross bar 72a, and the bar retainer 84b of the second compression assembly 80b is secured to a second cross bar 72b. Further as to each compression assembly, the compression springs 88a/88b extend from the compression plate 82a/82b in a direction toward the container 12 to bias the sensing element 16 against the outer surface of the container. With the bar retainer claw gripping one of the cross bars, the compression plate can be rotated into position against second cross bar different from the first cross bar, i.e., the compression plate 82a is rotated to be against a third cross bar 72c and the compression plate 82b is rotated to be against a fourth cross bar 72d. Once positioned in this manner, the wire clip 86a/86b is slid down about the associated cross bar to clip the respective compression plate 82a/82b to the associated cross bars 72, with the cross bar 72 being positioned in the bar channel formed by the wire clip 86 with the cross segment 94 locked against the outer width of the compression plate as shown also in FIGS. 15 and 17. In this example in particular, the wire clip 86a of the first compression assembly 80a clips the compression plate 82a of the first compression assembly 80a to the third cross bar 72c, and the wire clip 86b of the second compression assembly 80b clips the compression plate 82b of the second compression assembly 80b to the fourth cross bar 72d.

In this manner, the compression assemblies 80a and 80b are clipped in a secured fashion to the cage 14. In addition, once the clips 86 are applied, the compression springs 88 are compressed, and the outward bias of the compression springs 88 relative to the compression plates 82 presses the sensing element 16 against the outer surface of the container 12 to hold the sensing element against the outer surface of the container 12, and more specifically with the at least one conductive strip pressed against the outer surface of the outer in a highly conformable manner. As shown in FIG. 19, an optional press plate 89 may be employed between the spring 88 and the sensing element 16 to improve the compression force applied by the spring to the sensing element. The press plate 89 may be a plastic or metal disc. In the particular example of FIGS. 18 and 19, the use of two compression assemblies 80a and 80b is sufficient given the container size to effectively apply the entire sensing element 16 to the container surface, and any suitable number of compression assemblies may be employed depending upon a particular size of container and associated length of sensing element. In addition, this configuration that employs the wire clip configuration may be used regardless of cage bar spacing as the clip can be applied anywhere along the compression plate.

Figure 20:
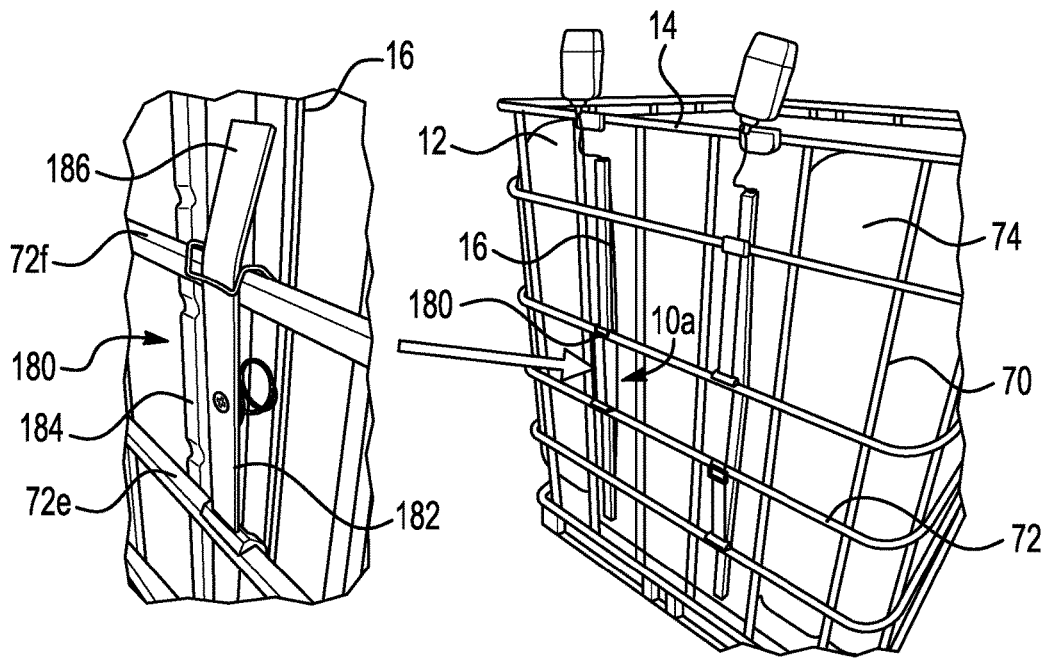
FIG. 20 is a drawing depicting a close-up view of a portion of FIG. 17 illustrating a portion of another sensor system in the region of a third compression assembly that is a variation on the compression assembly of FIGS. 15 and 16.

Variations of the compression assembly 80 of FIGS. 15-19 may be employed. For example, FIG. 20 depicts a close-up view of a portion of FIG. 17 illustrating a portion of another sensor system 10b in the region of a third compression assembly 180 that is a variation on the compression assembly 80 of the previous embodiment. The compression assembly 180 bears similarity to the previous embodiment, and includes at least the following variations. In this exemplary embodiment, the compression assembly 180 includes a modified compression plate 182 that is non-planar. In particular, the compression plate 182 includes a planar portion 184 that is secured to cage cross bars 72e and 72f in a manner comparably as described above, and an angled portion 186 that extends at an angle from the planar portion 184 toward the container 12. To accommodate cage bars of varying spacing, a relatively longer length of compression plate may be used to ensure the compression plate spans at least two cage cross bars, and thus depending upon the cage bar spacing there may be an excess portion of the compression plate. By configuring the compression plate 182 with two portions extending in a direction angled toward the container, safety is enhanced because the excess portion of the compression plate is less likely to snag on an operator or other equipment. In this manner, the compression plate 182 can accommodate a wider range of cage cross bar spacings, with any excess plate portion being bent around an associated cross bar as shown in FIG. 20 for enhanced safety.

Figure 21:
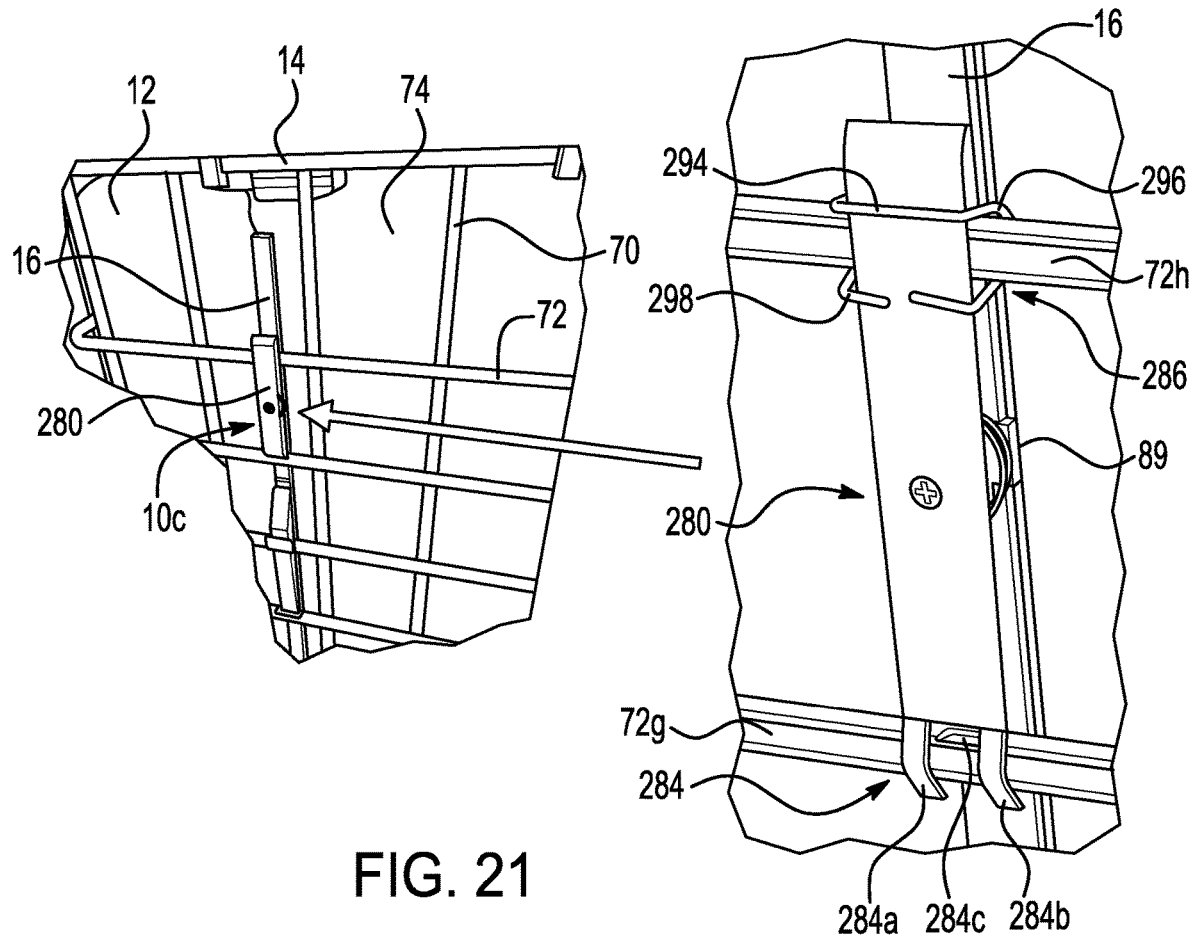
FIG. 21 is a drawing depicting another sensor system which includes a sensing element and another alternative configuration of a compression assembly, and a close-up view illustrating a portion of the sensor system in the region of the compression assembly.

FIG. 21 is a drawing depicting another sensor system 10c which includes the sensing element 16 and another alternative configuration of a compression assembly 280, and a close-up view illustrating a portion of the sensor system 10c in the region of the compression assembly 280. The compression assembly 280 bears similarity to the previous embodiment, and includes at least the following variations. Compression assembly 280 includes an alternative configuration of the bar retainer, denoted in FIG. 21 as bar retainer 284, and of the wire clip, denoted in FIG. 21 as wire clip 286. In this example, the bar retainer 284 includes a three-pronged claw configuration including two outer prongs 284a and 284b, and an opposing central prong 284c positioned on an opposite side of the cross bar relative to the outer prongs. In use, therefore, the outer prongs 284a and 284b are on an opposite side of the cage bar relative to the central prong 284c, and thus this three-pronged claw configuration provides a positive gripping force to better secure the bar retainer 284 to the associated transverse cross bar 72g.

In the above embodiments including the wire clip 86, the bar channel 102 is formed such that the wire clip 86 extends essentially over the top of the cage cross bar 72. In the configuration of the wire clip 286, the wire clip 286 has a cross segment 294 that lies against the compression plate comparably as the cross segment 94 of the wire clip 86. The wire clip 286, in contrast to the previous embodiment, has a securing segment 296 that wraps around the associated transverse cross bar 72h, and opposing bent segments 298 that bend around the compression plate 82 being essentially parallel to the cross segment 294. This configuration of the wire clip 286 provides a stronger fixation to the cage cross bar. To assemble the sensor system in place, the wire clip 286 is first positioned around the cross bar 72h. The compression plate is then slid upward through the wire clip 286, and then the compression plate may be pressed down onto the cross bar 72g with the bar retainer claw 284 gripping the cross bar 72g to achieve the position shown in FIG. 21. This embodiment also includes the optional press plate 89 located between the spring and the sensing element.

Figure 22:
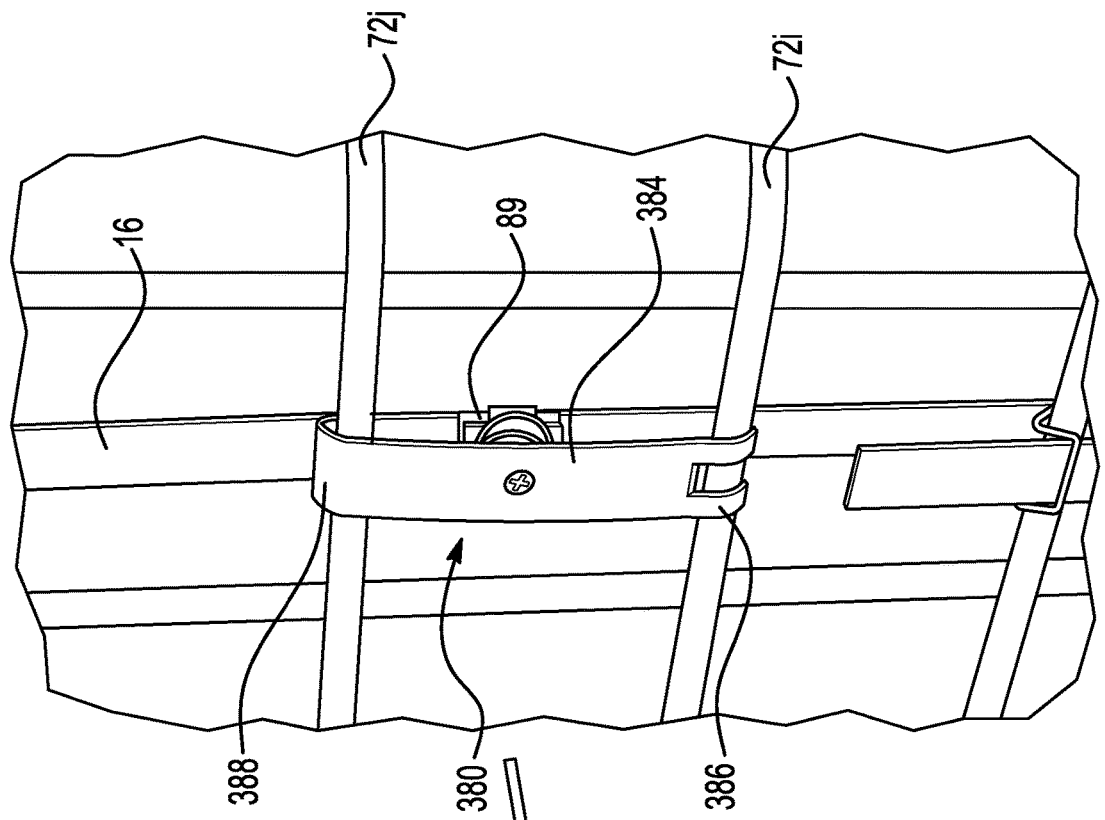
FIG. 22 is a drawing depicting another sensor system which includes a sensing element and another alternative configuration of a compression assembly, and a close-up view illustrating a portion of the sensor system in the region of the compression assembly.
Figure 22:
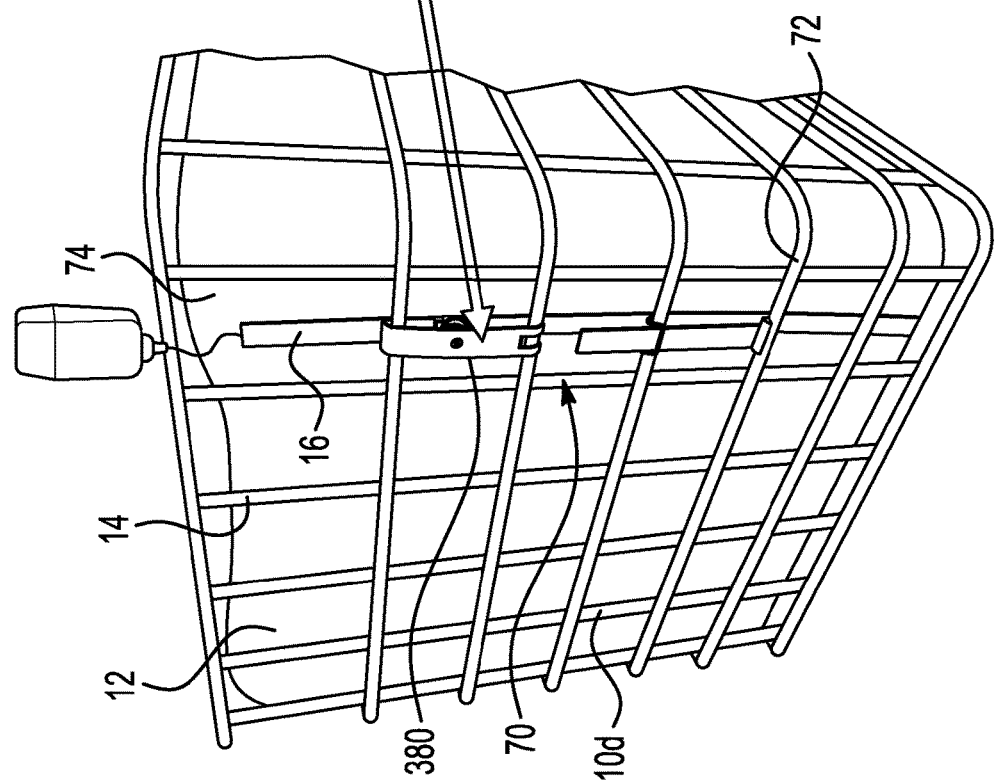

FIG. 22 is a drawing depicting another sensor system 10d which includes the sensing element 16 and another alternative configuration of a compression assembly 380, and a close-up view illustrating a portion of the sensor system 10d in the region of the compression assembly 380. The compression assembly 380 bears similarity to the previous embodiment, and includes at least the following variations. Compression assembly 380 includes an alternative configuration that does not use a wire clip. Instead, the compression assembly 380 includes a compression plate 384 that includes a first bar retainer 386 positioned at a first end of the compression plate 384, and a second bar retainer 388 positioned at a second end of the compression plate 384 opposite from the first end. The first bar retainer 384 may be configured as pronged or claw shaped bar retainer similarly as in previous embodiments to grip a first cross bar 72*i*, and the second bar retainer 388 may be configured as a bent portion of the compression plate that bends around a second cross bar 72*j*. For assembly, the compression plate is slid into position from top to bottom such that the first bar retainer 386 catches the cross bar 72*j*, and until the second bar retainer 388 grips the cross bar 72*i*. This embodiment also includes the optional press plate 89 located between the spring and the sensing element.

In connection with the first embodiment, the sensing element 16 includes a single conductive strip 26 that is applied to the foam ribbon 24 oppositely from the metal channel 22, and thus the metal channel 22 and conductive strip 26 with the foam ribbon 24 therebetween form a capacitor. Such configuration of the sensing element may be used in combination with any configuration of compression assembly. In addition, an alternative configuration of the sensing element may employ a multiple or plurality of conductive strips of different lengths that are applied to the foam ribbon 24 oppositely from the metal channel 22, and thus the metal channel 22 and conductive strips with the foam ribbon 24 therebetween form multiple capacitors of different sizes. The use of a multiple or plurality of conductive strips of different lengths can improve the accuracy of the liquid level measurement. Such configuration of the sensing element employing multiple conductive strips also may be used in combination with any configuration of compression assembly.

Figure 23:
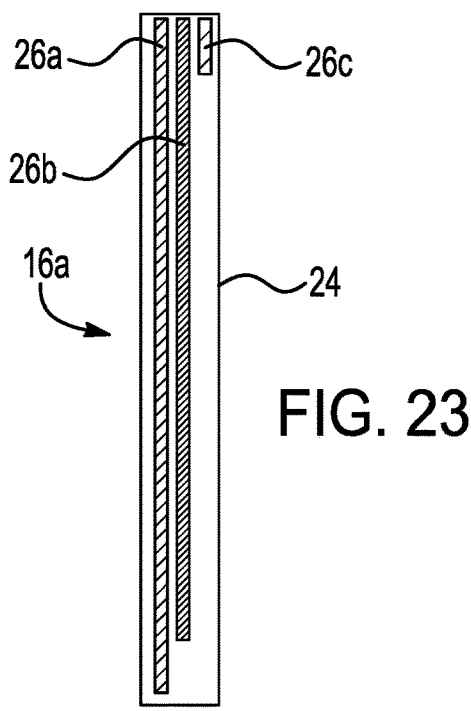
FIG. 23 is a drawing depicting an alternative configuration of an exemplary sensing element including multiple conductive strips.

FIG. 23 is a drawing depicting an alternative configuration of an exemplary sensing element 16*a*. In the embodiment of FIG. 23, sensing element 16*a* includes a plurality of conductive strips of different lengths that are applied to the foam ribbon 24 oppositely from the metal channel (omitted from FIG. 23 for simplicity of illustration). In this particular example, three conductive strips 26*a*, 26*b*, and 26*c* of different lengths are applied to foam ribbon 24, although it will be appreciated any suitable number of conductive strips may be employed. Conductive strip 26*a* has a first length that corresponds to a 100% level detector in that conductive strip 26*a* extends along substantially the full length of the sensing element. Accordingly, conductive strip 26*a* is positioned to measure a liquid level over the entire length of the sensing element. Conductive strip 26*b* has a second length different from the first length, which in this example corresponds to a 90% level detector in that conductive strip 26*b* extends along about 90% of the length of the sensing element as measured from the top of sensing element. Accordingly, conductive strip 26*b* is positioned to measure a liquid level over 90% of the length of the sensing element, which in other words detects liquid level when the container is from about entirely full emptying down to about 10% full. Conductive strip 26*c* has a third length different from the first and second lengths, which in this example corresponds to a 10% level detector in that conductive strip 26*c* extends along about 10% of the length of the sensing element as measured from the top of sensing element. Accordingly, conductive strip 26*c* is positioned to measure a liquid level over 10% of the length of the sensing element, which in other words detects liquid level when the container is from about entirely full emptying down to about 90% full. The configuration of three conductive strips represents an example, and additional conductive strips and/or conductive strips of different percentage lengths may be employed as may be suitable for any particular application.

Figure 24:
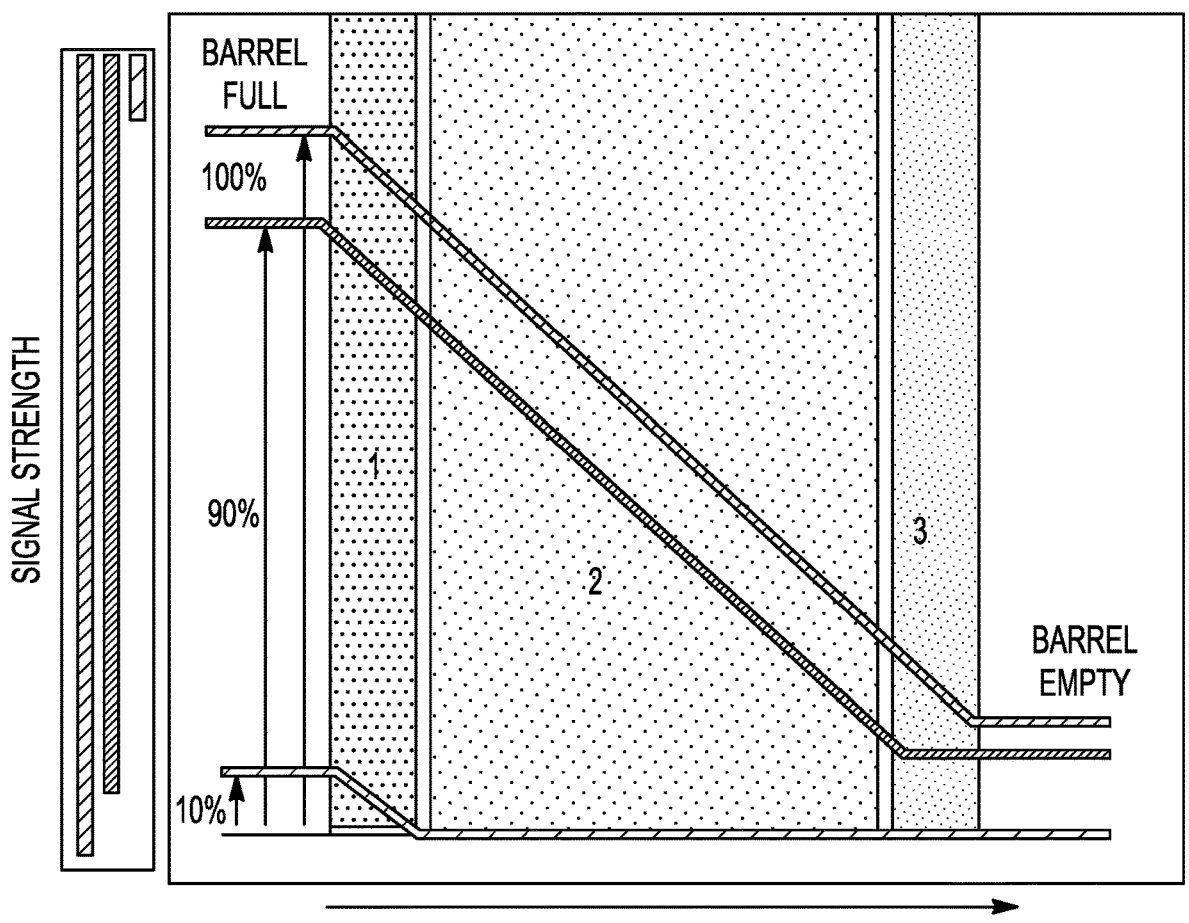
FIG. 24 is a graphical depiction of the manner by which the use of multiple conductive strips of different lengths may be employed to provide a more informative indication of the liquid level in the container

FIG. 24 is a graphical depiction in the manner by which the use of multiple conductive strips of different lengths may be employed to provide a more informative indication of the liquid level in the container or barrel. Moving along the horizontal axis corresponds to the barrel progressively emptying, and the vertical axis indicates the signal strengths of the signals being received off of the respective conductive strips based on the capacitance measurements. At a given liquid level, the signal strength measured off of the conductive strips is higher the longer the length of the conductive strip. Starting at the left portion of the graph of FIG. 24, with the barrel full all three conductive strips generate a maximum signal. As the barrel is emptied, the liquid level first moves through Zone 1 and the signal strengths measured from each of the conductive strips decreases in a linear fashion as the barrel is emptied from full. As referenced above, conductive strip 26*c* corresponds to a 10% level detector in that conductive strip 26*c* extends along about 10% of the length of the sensing element as measured from the top of sensing element, which in other words detects liquid level when the barrel is from about entirely full emptying down to about 90% full. Accordingly, when the liquid level in the barrel falls below 90% full, shown as the transition from Zone 1 to Zone 2, the signal strength measured off of conductive strip 26*c* goes flat as conductive strip 26*c* is no longer in contact with a portion of the barrel commensurate with the liquid content. The signal strength measured off of conductive strip 26*c* will remain flat through the course of further emptying of the barrel because conductive strip 26*c* will remain spaced away from the vicinity of the liquid content.

Similar measurements are observed as to the other conductive strips as the barrel is further emptied through Zones 2 and 3. In particular, as the barrel is emptied further, the liquid level next moves through Zone 2 and the signal strengths measured from each of conductive strips 26*a* and 26*b* decreases in a linear fashion as the barrel is emptied further (again, the signal from conductive strip 26*c* has gone flat). As referenced above, conductive strip 26*b* corresponds to a 90% level detector in that conductive strip 26*b* extends along about 90% of the length of the sensing element as measured from the top of sensing element, which in other words detects liquid level when the barrel is from about entirely full emptying down to about 10% full. Accordingly, when the liquid level in the barrel falls below 10% full, shown as the transition from Zone 2 to Zone 3, the signal strength measured off of conductive strip 26*b* also goes flat as conductive strip 26*b* now is no longer in contact with a portion of the barrel commensurate with the liquid content. The signal strength measured off of conductive strip 26*b* from here on will remain flat through the course of further emptying because conductive strip 26*b* will remain spaced away from the vicinity of the liquid content.

Similarly, as the barrel is emptied further, the liquid level next moves through Zone 3 and the signal strength measured from conductive strips 26*a* decreases in a linear fashion as the barrel is emptied further (again, the signal from both conductive strips 26*b* and 26*c* have gone flat). As referenced above, conductive strip 26*a* corresponds to a 100% level detector in that conductive strip 26*a* extends along essentially the entire length of the sensing element, which in other words detects liquid level when the barrel is from about entirely full emptying down to about entirely empty. Accordingly, when the liquid level in the barrel falls to empty at the end of Zone 3, the signal strength measured off of conductive strip 26*a* also goes flat as conductive strip 26*a* now is no longer in contact with a portion of the barrel commensurate with the liquid content. In other words, when the barrel is empty, the signal strengths of each of the conductive strips is at a minimum.

In this manner, the use of multiple or a plurality of conductive strips of different lengths provides a more informative indication of liquid level in the container or barrel. In particular, the relative signal strengths provide an indication of the zone of the container in which the current liquid level is present based on which signal strengths have gone flat. In the depicted example, three conductive strips of different lengths indicate three zones of liquid level in addition to full and empty. The use of additional conductive strips of different lengths would result in a commensurate addition of more zones of liquid level to enhance the liquid level measurement.

In the example depicted in the figures, the sensor systems include a unitary sensing that extends along the container surface essentially without interruption. In other embodiments of the sensor system, the sensing element and the compression assembly may be divided into separate segments that each is separately fixed to the container and cage. The separate segments may be daisy chained to each other whereby the segmented sensing element components are electrically connected to each other by intervening wires with a single electrical connection to the sensor electronics, or each segmented sensing element can be wirelessly connected, such as by a Bluetooth or comparable wireless connection, to the sensor electronics. Segmented configurations provide a more modular design that may accommodate different cage configurations, but also may require more effort to install as each segment is installed individually and may require more power to operate.

The described configuration of the sensor system results in many advantages and efficiencies in monitoring liquid levels in nonmetallic containers for hazardous liquids, such as for example may be employed in DEF and other intermediate bulk container applications. The remote monitoring of liquid containers allows for efficient logistics of distributors of these liquids and chemicals by allowing distributors to know when and where customers need product. The external monitoring further allows for continuous, high resolution capacitance measurements for monitoring the hazardous or corrosive liquid levels without opening the container, which prevents material contamination and harmful exposure to personnel. The sensor system including the particular configuration of the compression assembly provides for easy installation and application of the sensing element to the outer surface of the container located within the cage in a highly conformable manner. Installation, therefore, does not require a factory install, and the sensor system can be installed aftermarket without strong technical expertise and can be easily uninstalled at any time to be reused on another container. The sensor electronics provides efficient, battery powered operation of the sensing element with long-life battery operation without needing charge or replacement, and further permitting the wireless communication of sensor information to external electronic devices which also can include GPS tracking.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A sensor system for determining a liquid level in a container that is housed within a cage, the sensor system comprising:
    a capacitive sensing element comprising a metal channel that houses a foam ribbon, and at least one conductive strip that is applied to the foam ribbon oppositely from the metal channel, whereby the metal channel and the at least one conductive strip with the foam ribbon therebetween form a capacitor, and
    a compression assembly configured to attach the sensing element to the cage while applying a biasing force that presses the at least one conductive strip of the capacitive sensing element to an outer surface of the container;
wherein the liquid level in the container is determined based on a change in capacitance along the capacitive sensing element.

2. The sensor system of claim 1, wherein the capacitive sensing element further comprises a printed circuit board located within the metal channel that is electrically connected to the conductive strip, wherein the printed circuit board includes capacitance reading circuitry that can electronically communicate a capacitance measurement.

3. The sensor system of claim 1, wherein the at least one conductive strip comprises a plurality of conductive strips of different lengths.

4. The sensor system of claim 1, wherein the compression assembly comprises:
    a channel frame that defines a bar channel for receiving a longitudinal bar of the cage for securing the sensor system to the cage;
    a plurality of clamps that are clamped onto the channel frame, wherein each of the plurality of clamps defines cutouts for receiving a cross bar of the cage for further securing the sensor system to the cage; and
    a plurality of springs that are positioned in the channel frame, wherein the plurality of springs when compressed asserts an outward bias from the channel frame to press the sensing element against the outer surface of the container.

5. The sensor system of claim 4, wherein the channel frame includes a base and opposing sides that extend perpendicularly from the base to form the bar channel, and the opposing sides have a plurality of cutouts that are positioned in use to extend around cross bars of the cage.

6. The sensor system of claim 4, wherein each of the plurality of clamps has a clamp base and arms that define a frame receiving space for receiving the channel frame when the clamp is clamped onto the channel frame, and each of the arms includes one of the cutouts such that in use when the clamp is clamped onto the channel frame, the clamp may be slid along the channel frame such that the cutouts receive a cross bar of the cage.

7. The sensor system of claim 4, wherein each of the plurality of springs is a coil spring.

8. The sensor system of claim 1, wherein the compression assembly comprises:

a compression plate;
a bar retainer that is attached to a first end of the compression plate and includes a recessed retainer that is configured to receive a first cross bar of the cage;
a wire clip including a plurality of clip segments that form a bar channel that is configured to receive a second cross bar of the cage different from the first cross bar received by the bar retainer, wherein the wire clip is configured to clip the compression plate to the second cross bar; and
a spring that is positioned on the compression plate, wherein the spring when compressed asserts an outward bias from the compression plate to press the sensing element against the outer surface of the container.

9. The sensor system of claim 8, wherein the bar retainer has a claw configuration including a plurality of prongs.

10. The sensor system of claim 8, wherein the wire clip has a securing segment that wraps around the second cross bar and opposing bent segments that bend around the compression plate.

11. The sensor system of claim 8, wherein the compression plate and the bar retainer are formed as an integral component.

12. The sensor system of claim 1, wherein the compression assembly comprises:
a compression plate;
a first bar retainer that is attached to a first end of the compression plate and includes a recessed retainer that is configured to receive a first cross bar of the cage; a second bar retainer that is attached to a second end of the compression plate opposite from the first end and includes a bent portion of the compression plate that bends around a second cross bar of the cage; and
a spring that is positioned on the compression plate, wherein the spring when compressed asserts an outward bias from the compression plate to press the sensing element against the outer surface of the container.

13. The sensor system of claim 1, further comprising sensor electronics electrically connected to the capacitive sensing element for electrical communication with the capacitive sensing element.

14. The sensor system of claim 13, wherein the sensor electronics includes a wireless interface for electronically transmitting sensor information to an external electronic device, the sensor information comprising capacitance measurements received from the sensing element and/or a liquid level in the container determined based on the capacitance measurements, and a battery for powering the capacitive sensing element.

15. A capacitive sensing element for use in a sensor system for determining a liquid level in a container, the capacitive sensing element comprising:
a metal channel;
a foam ribbon that is housed within the metal channel; and
at least one conductive strip that is applied to the foam ribbon oppositely from the metal channel, whereby the metal channel and the at least one conductive strip with the foam ribbon therebetween form a capacitor;
wherein the liquid level in the container is determined based on a change in capacitance along the capacitive sensing element.

16. The capacitive sensing element of claim 15, further comprising a printed circuit board located within the metal channel that is electrically connected to the at least one conductive strip, wherein the printed circuit board includes capacitance reading circuitry that can electronically communicate a capacitance measurement.

17. The capacitive sensing element of claim 15, wherein the at least one conductive strip comprises a conductive fabric material.

18. The capacitive sensing element of claim 15, wherein the at least one conductive strip comprises a conductive paint applied to a silicone rubber base.

19. The capacitive sensing element of claim 15, wherein the metal channel is made of aluminum.

20. The sensor system of claim 15, wherein the at least one conductive strip comprises a plurality of conductive strips of different lengths.

* * * * *